Figure 1:
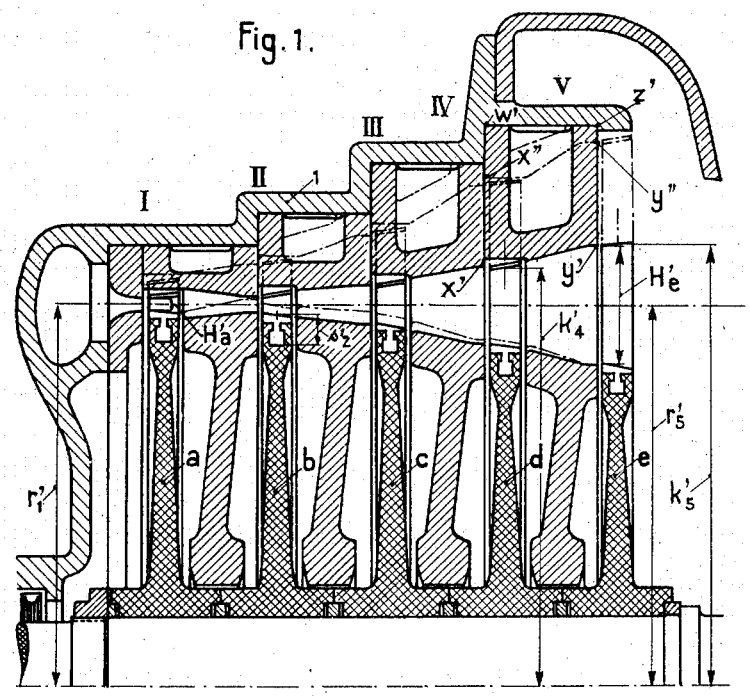

Inventor:
Paul Spiess

UNITED STATES PATENT OFFICE.

PAUL SPIESS, OF ZURICH, SWITZERLAND.

CONSTRUCTION OF TURBINES.

1,390,733.  Specification of Letters Patent.  Patented Sept. 13, 1921.

Application filed January 2, 1920. Serial No. 349,035.

*To all whom it may concern:*

Be it known that I, PAUL SPIESS, a citizen of the Republic of Switzerland, residing at Zurich, Switzerland, have invented certain new and useful Improvements in the Construction of Turbines; and I do hereby declare the following to be a clear, full, and exact description of the invention, such as will enable others skilled in the art to which it appertains to make and use the same, reference being had to the accompanying drawing and to letters or figures of reference marked thereon, which form a part of this specification.

In a standardization which is aimed at in engine building with regard to an economical manner of manufacturing, comparatively narrow limits are set as far as the production of power engines is concerned, as the nominal outputs and the available means for producing power are manifold. Standardization in the special case hereinafter described has the meaning of the production of power engines of the same kind for various outputs by using the same pattern for the casing. Such engines form a series. The less the different outputs of one series of engines are limited, the fewer is the number in the series and the more economic the manufacture, as the number of patterns, of gages and tools for engines and for parts thereof is diminished accordingly. This method of production enables one to manufacture and carry in stock a large number of single parts and to fit them together to engines of different outputs when necessity arises.

This invention provides for standardizing steam- and gas-turbines of the multistage-, axial flow-, free jet-type within comparatively wide limits. The outputs of one series of turbines which are built by using the same pattern for the casing lie between limits which are approximately in the ratio of from 2:5 up to 1:5 to one another, *i. e.* the largest turbine of one series has an output which is 2.5 to 5 times that of the smallest turbine of the same series.

In spite of these wide limits with regard to the nominal outputs, the same maximum efficiency for every single turbine within one series may be guaranteed as is the case with individual production. This effect is attained by constructing the guide-wheels of a given stage of a series with passages having approximately the same inside diameter but different outside diameters corresponding to the volume of steam to be dealt with. The runner disks of the same stage of a given series may be constructed of the same diameter and fitted with blades of different lengths for the different volumes of steam. The small alterations to the inside diameter of the runner passages which are necessary in any one stage of a series to suit different volumes of steam may be effected by a corresponding radial adjustment of the inner face of the rotor-blade passages.

For this purpose packing pieces of different heights may be inserted in case the rotor-blades are provided with smooth faces and backs from the tip to the root or which do not fill up the intermediate space between two subsequent roots of blades. All the parts of a turbine except the guide-wheels and the rotor-wheels can be manufactured in a large quantity without having fear that some of these parts may not be used economically later on. Furthermore as one single size of runner disk is used in the same stage of a given series only one single set of gages and tools is to be manufactured for all runner disks of such a series. The cost of production decreases correspondingly and the time of delivery for such turbines is shortened.

On the other hand this invention enables the highest demands which may be made to be met as regards efficiency of every single turbine series for given nominal outputs and steam conditions. For large nominal outputs longer guide-blades and runner blades may be used and in consequence thereof larger mean diameters of wheels may be attained especially toward the low-pressure part, than for small nominal outputs.

The consequence of this method is a more favorable ratio between the velocity of discharge $(c_0)$ of the steam and the mean peripheral velocity $(u_1)$, *i. e.* a more favorable ratio of $c_0 : u_1$ which is very desirable in case of the larger output of the turbine of a series.

For the same output and a higher vacuum, and therefore a greater drop of heat and furthermore assuming the smallest outlet losses from the last runner, greater lengths of guide blades and runner blades in the low pressure part and therefore larger mean diameters result. On account of the increased mean diameters of the low-pressure part, the ratio of the velocity of the discharge $c_0$ to the main peripheral speed $u_1$, and thereby the thermodynamical efficiency remains the same as for the same nominal output at a lower vacuum, that is at a smaller drop of heat. The utilization of different drops of heat at the highest efficiency in one series of turbines is realized without any alteration to the number of stages and to the runner disk diameter being necessary.

The range of use of one series of turbines with ready made parts for the main turbine is therefore very extended not only as regards nominal outputs but also as regard steam conditions.

Figure 2:
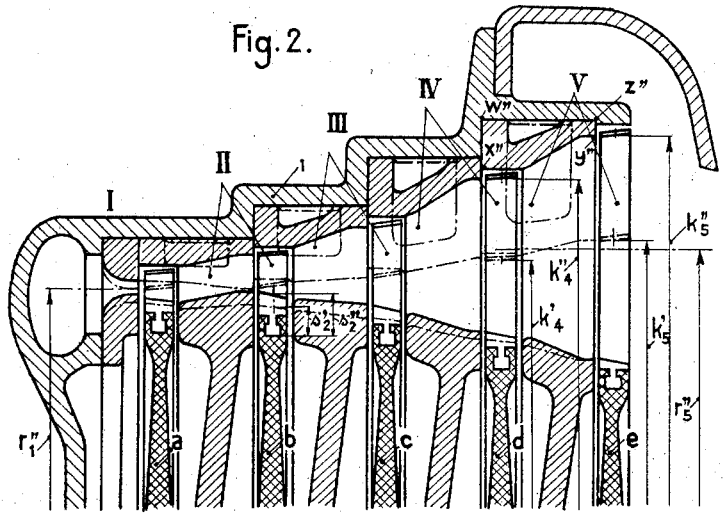

The drawing shows as example of carrying the invention into effect two longitudinal sections through parts of two five stage-free-jet steam turbines appertaining to one series and Figure 1 refers to the turbine of the smallest output $N_1$ and Fig. 2 to the turbine of the largest output $N_2$ of this series, constructed to run with the same speed and for the same steam conditions. The ratio of the outputs $N_1 : N_2$ is within the limits 2:5 and 1:5. (For the next series of turbines, the smallest nominal output $N_1$ of which is larger than the largest nominal output $N_2$ of the present series, a new pattern for the casing is necessary which suffices again for all the turbines of this larger series.) Both the turbines shown in Figs. 1 and 2 have exactly the same casing 1. The latter is in both cases cast of the same pattern and is provided with the same bores and other machined faces. Furthermore both turbines are fitted with the same runner disks $a$, $b$, $c$, $d$, $e$ in the stages I–V. (A stage consists in this case of one runner and one guide-wheel.) On account of the smaller output $N_1$, the turbine shown in Fig. 1 utilizes a smaller volume of steam than the second turbine, the output $N_2$ of which may be 2.5–5 times as great as $N_1$. The length of the blades and radial dimensions of the guide wheels are therefore smaller in the first case than in the second.

According to Fig. 1 the runner blades of all five wheels $a$–$e$ have the same mean admission radius, i. e. $r'_1 = r'_5$. A runner blade of the first wheel has the radial height $H'_a$, that of the last wheel is $H'_e$, the heights of the other runner blades are between these two lengths. In order to guide the steam to the blades of said heights guide passages are provided in the stages I–V which are of the meridian sections shown in Fig. 1 by full lines. That portion of the meridian section of the guide wheels provided in the stages II to V which is on the outside of the guide passages is of U-shape, the radial shanks of this portion being, especially in the low-pressure stages, of considerable length. For instance the radial height of the first shank of the filler is $x' - w'$.

According to Fig. 2 the runner blades of the five wheels have a main admission radius which increases from the first to the last pressure stage from the initial length $r''_1$ to the final length $r''_5$. The heights of the blades are much greater than in the turbine of smaller output shown in Fig. 1. Therefore the guide wheels provided in the casing 1 have guide passages of a larger mean admission radius as well as larger radial height. The outlines of the meridian section through the blades and guide wheels are shown in full lines. For the sake of comparison the outlines of the meridian section through the blades and guide wheels of a turbine shown in Fig. 1 in full lines, are illustrated in Fig. 2 in dash and dot lines. (On the other hand the corresponding sections of Fig. 2 are shown in Fig. 1 in dash and dot lines.) This comparison shows that in the turbine of the greater output according to Fig. 2, the inner faces of the guide-and-runner passages are displaced only by a small amount into those in Fig. 1. In using runner blades the faces and backs of which are continuous over their whole extent from tip to root and between which so-called packing pieces or spacing blocks are inserted, it is made possible to take into account the projection of the inner face of the runner passages of turbine 2 as against turbine 1 by inserting higher packing pieces. In this way the runner of the pressure stage II is for instance provided with a packing piece of an average height of $s''_2$ according to Fig. 2, while the mean height of the corresponding packing piece for the smaller output (turbine 1) is only $s'_2$. The outer ends of the runner blades extend in the larger turbine (Fig. 2) much farther than in the smaller turbine (Fig. 1). While, for example, the radii of the blade tip circle in the pressure stages IV and V are $k'_4$ and $k'_5$ for the smaller output (see Figs. 1 and 2), the corresponding radii for the larger output are $k''_4$ and $k''_5$. For stage V of the smaller output (Fig. 1) a guide wheel has to be provided, the portion of which, that extends beyond the outer face of the passage in the meridian section, has the outline shape $w'-x'-y'-z'$, whereas for stage V of the larger output a guide wheel has to be provided, the portion of which, that extends beyond the outer face of the passage in the meridian section, has the outline shape $w''-x''-y''-z''$. In the first turbine the heights of the shanks $w'-x'$ and $y'-z'$ of the U-shaped extension or part of the guide-wheel body are greater than the heights of the shanks $w''-x''$ and $y''-z''$ of turbine 2.

I claim—

1. A series of steam- or gas- turbines of the multistage-, axial flow-, disk-, free-jet type, in which the largest turbine of the series has an output that is 2.5 to 5 times as large as that of the smallest turbine, comprising a standard casing of exactly the same dimensions for all the turbines of the series, a plurality of guide wheels the passages of which have in the corresponding stages of all the turbines of the series approximately the same inside diameter but different outside diameters according to the volumes of steam to be dealt with, and a plurality of runners.

2. A series of steam- or gas-turbines of the multistage-, axial flow-, disk-, free-jet type, in which the largest turbine of the series has an output that is 2.5 to 5 times as large as that of the smallest turbine, comprising a standard casing of exactly the same dimensions for all the turbines of the series, a plurality of guide wheels the passages of which have in the corresponding stages of all the turbines of the series approximately the same inside diameter but different outside diameters according to the volumes of steam to be dealt with, and a plurality of runners, the disks of which having in any one stage the same dimensions for all the turbines of the series and blades of different height for dealing with the different volumes of steam.

3. A series of steam or gas-turbines of the multistage, axial flow, disk, free-jet type in which the largest turbine of the series has an output of two and one half to five times as great as the smallest turbine of the series, comprising a standard casing of the same dimensions for all turbines of the series, a plurality of guide wheels whose passages in the corresponding stages of all turbines of the series have approximately the same inside diameter but different outside diameters according to the volumes of steam to be dealt with, a plurality of runners the disks of which have in any one stage the same dimensions for all turbines of the series and blades of different heights on said disks providing passages for the steam to be dealt with, the inside diameters of said blade passages differing by a small amount in the corresponding stages of all turbines of a series for different volumes of steam for different outputs.

4. A series of steam or gas turbines of the multistage, axial flow, disk, free-jet type in which the largest turbine of the series has an output of two and one half to five times that of the smallest turbine, comprising a casing of the same dimensions for all the turbines of the series, a plurality of guide wheels whose passages are approximately of the same inside diameters in corresponding stages of all the turbines of the series but of different outside diameters according to the volume of steam to be dealt with, a plurality of runners, the disks of which in any one stage have the same dimensions for all turbines of the series, and runner blades having roots of different heights to compensate for slight variations in similar stages for turbines of different output.

5. A turbine construction having a staged casing of uniform dimensions for turbines of different outputs, runner disks of the same diameter for any one stage of turbines of different output, and guide disks having peripheral extensions overlapping the runner disks between their peripheries and the casing.

6. A turbine construction having a staged casing of uniform dimensions for turbines of different outputs, runner disks of the same diameter for any one stage of turbines of different output, guide disks having peripheral extensions overlapping the runner disks between their peripheries and the casing and runner blades having roots of different heights to compensate for slight variations of a stage for turbines of different output.

7. Multistage turbines of the axial flow type whose rotor disks in a given stage of a turbine group are provided with steam passages of approximately the same internal diameter and whose outer diameters differ in accordance with the steam volume to be used in a particular turbine of a series of turbines using the same casing, whereby the output of different turbines of the series using the same size and shape of casing may be varied from 1:5 to 2:5.

In testimony that I claim the foregoing as my invention, I have signed my name.

PAUL SPIESS.